UNITED STATES PATENT OFFICE.

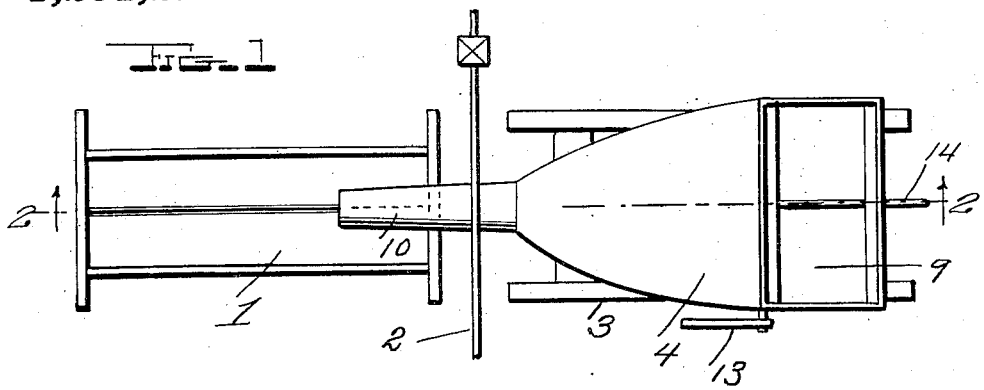
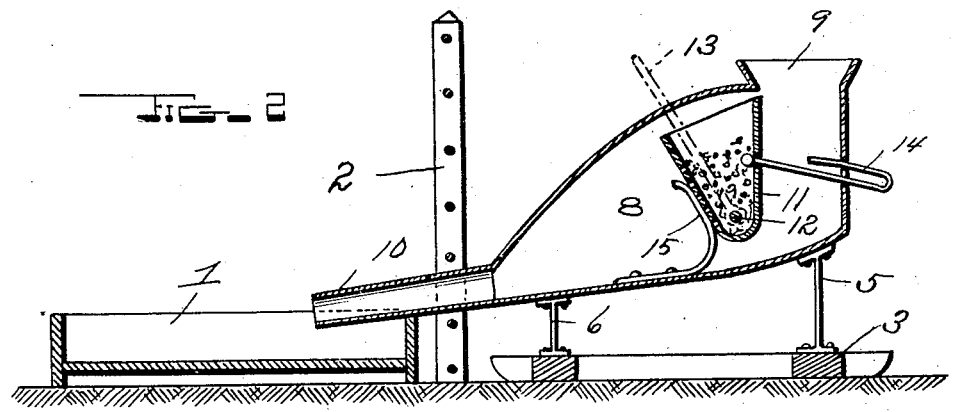
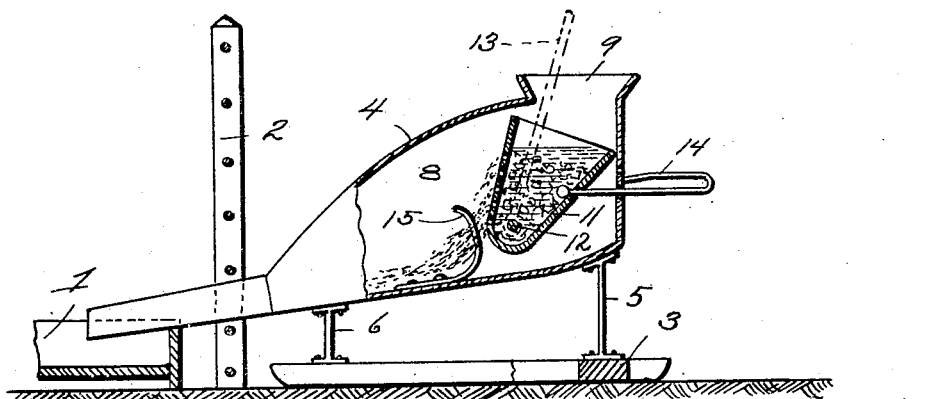

RONALD ARTHUR GARD, OF CYLINDER, IOWA.

HOG-WATERER.

1,251,215.

Specification of Letters Patent. Patented Dec. 25, 1917.

Application filed April 18, 1917. Serial No. 162,974.

*To all whom it may concern:*

Be it known that I, RONALD ARTHUR GARD, a citizen of the United States, residing at Cylinder, in the county of Palo Alto and State of Iowa, have invented new and useful Improvements in Hog-Waterers, of which the following is a specification.

My present invention pertains to devices for watering hogs and other animals.

One of the objects of the invention is the provision of a waterer embodying such construction that hogs may be supplied with water, swill and the like through a fence, with a view to avoiding disturbing and exciting the hogs.

Another object of the invention is the provision of a waterer constructed and arranged to be expeditiously and easily moved from one hog house or inclosure to another.

Another object is the provision of a waterer equipped with means whereby the water may be impregnated with salt or other substance when the operator so desires, and this without subjecting the operator to greater effort than when he is supplying the hogs with water or swill.

Other objects and advantages of the invention will be fully understood from the following description and claims when the same are read in connection with the drawings, accompanying and forming part of this specification, in which:

Figure 1 is a top plan view showing my novel waterer as properly arranged relative to a fence and a feed trough inclosed by and adjacent to the fence.

Fig. 2 is a vertical section, taken in the plane indicated by the line 2—2 of Fig. 1, and showing the salt holder in its idle position—*i. e.*, the position in which it is placed when it is desired to supply plain water or swill to the hogs.

Fig. 3 is a view, partly in elevation and partly in section, showing the salt holder in the position in which it is placed when it is desired to impregnate the water or swill with salt, condition powders, medicine or the like.

Similar numerals of reference designate corresponding parts in all of the views of the drawings.

The trough 1 and the fence 2 may be of any suitable construction, and I would here have it understood that the term fence as herein employed is intended to comprehend the open-work wall of any hog house or hog inclosure or pen.

3 is a skid on which my novel waterer is preferably mounted to facilitate its movement from place to place, though it may be mounted on any other suitable base without affecting my invention.

The waterer is indicated by 4 and may be mounted on a single support 5 or on two supports 5 and 6 through which it is connected with the skid or other base. The said waterer is preferably made of sheet metal, is hollow as indicated by 8, and is provided with a mouth 9 and a discharge spout 10, the latter being designed to be extended through the fence and arranged to discharge into the trough 1, as shown.

Pivoted at 12 in the waterer 4 is a holder 11 for salt, condition powders, medicine or other substance that it is desired to distribute in the water incidental to the passage of the latter through the waterer. The pivot is preferably formed by a transverse shaft which is fixed to the holder and journaled in the sides of the waterer and is provided at one side of the waterer with a handle 13 for convenient manipulation. The said holder 11 is provided with a foraminous forward side as shown in Figs. 2 and 3, is designed when idle to rest against a stop 15, and is provided with a rearwardly extending bar 14 which works loosely through apertures in the rear wall of the waterer and is designed when positioned as shown in Fig. 3 to bear against said rear wall and thereby detachably secure the holder 11 in its working position.

It will be gathered from the foregoing that my novel device is adapted to be readily moved from trough to trough, and that when the holder 11 is in the position shown in Figs. 1 and 2 it does not bar or otherwise interfere in any measure with the pouring of water, swill or the like through the waterer and into the trough. In this connection it will be appreciated that the water, swill or the like is fed through the fence, and in consequence the watering or feeding is effected without exciting the hogs, without liability of water or swill being wasted, and without danger of any of the hogs being injured.

When it is desired to salt the hogs at the same time that water is supplied, the holder 11 is placed in the position shown in Fig. 3 and is charged with rock-salt, and in consequence of this when the water is poured into the waterer it will pass through the salt and the holder, with the result that en route to the trough it will be impregnated with salt, and this in an even manner so that all of the hogs drinking at the trough will be supplied with an equal quota of salt.

The holder 11 is also adapted to be used to advantage when it is desired to supply condition powders, medicine or the like to the hogs in lieu of salt; the condition powders, medicine or other substance being taken up by the water in passing in the same manner as the salt.

I have entered into a detailed description of the construction and relative arrangement of the parts embraced in the present and preferred embodiment of my invention in order to impart a full, clear and exact understanding of the said embodiment. I do not desire to be understood as confining myself, however, to the said specific construction and relative arrangement of parts inasmuch as in the future practice of the invention such changes or modifications may be made as fairly fall within the scope of my appended claims.

Having described my invention, what I claim and desire to secure by Letters-Patent, is:

1. The combination of a hog waterer, hollow in form, and having an inlet and a discharge, and a holder for salt and other substance, disposed in the waterer and open at its upper side to receive water supplied through said inlet and having foraminations for the escape of water impregnated with salt or other substance; the said holder being movable in the waterer to present its upper side toward and away from the inlet of the waterer, and being arranged in spaced relation to a wall of the waterer, whereby when the holder is moved to dispose its upper side away from the inlet, water may be poured through the waterer without being impregnated with salt or other substance contained in the holder.

2. The combination of a hog waterer, hollow in form, and having an inlet in its top adjacent to its rear end and also having a forward discharge, a holder for salt and other substance disposed in the waterer and open at its upper side to receive water supplied through said inlet and having back and side walls and also having foraminations in its forward wall; the said holder being pivoted adjacent to its lower end in the waterer, whereby it may be swung therein to present its upper side toward or away from the said inlet, and being arranged in a spaced relation to a wall of the waterer.

3. The combination of a hog waterer, hollow in form, and having an apertured rear wall and an inlet in its top adjacent to said wall and also having a forward discharge portion, a holder for salt and other substance, disposed in the waterer and open at its upper side to receive water supplied through said inlet and having foraminations for the escape of water impregnated with salt or other substance; the said holder being movable in the waterer to present its upper side toward and away from the inlet, and being arranged in spaced relation to a wall of the waterer, and a bar connected to and extending rearwardly from the holder and through the apertured rear wall of the waterer and constructed and arranged in one position to bear against said wall and thereby retain the holder in working position.

4. The combination of a waterer, hollow in form, and having an inlet in its top wall adjacent to its rear end and also having a forward discharge portion, a stop in the lower portion of the waterer in front of said inlet, and a holder disposed in the waterer and open at its upper side and having back and side walls and also having foraminations in its front wall; said holder being pivoted near its lower end in the waterer and adapted to be swung forwardly against said stop and rearwardly away from the same.

In testimony whereof I have hereunto set my hand in presence of two subscribing witnesses.

RONALD ARTHUR GARD.

Witnesses:
GEORGE A. FREEMAN,
B. E. FROST.

Copies of this patent may be obtained for five cents each, by addressing the "Commissioner of Patents, Washington, D. C."